(12) United States Patent
Childs et al.

(10) Patent No.: US 7,617,082 B2
(45) Date of Patent: Nov. 10, 2009

(54) METHOD, SYSTEM AND PROGRAM STORAGE DEVICE FOR SIMULATING FLUID FLOW IN A PHYSICAL SYSTEM USING A DYNAMIC COMPOSITION BASED EXTENSIBLE OBJECT-ORIENTED ARCHITECTURE

(75) Inventors: Paul Childs, Cambridge (GB); David R. DeBaun, Danville, CA (US); Thomas J. Byer, San Gabriel, CA (US)

(73) Assignees: Chevron U.S.A. Inc., San Ramon, CA (US); Schlumberger Technology Corporation, Houston, TX (US)

( * ) Notice: Subject to any disclaimer, the term of this patent is extended or adjusted under 35 U.S.C. 154(b) by 253 days.

(21) Appl. No.: 11/290,995

(22) Filed: Nov. 29, 2005

(65) Prior Publication Data
US 2006/0282243 A1 Dec. 14, 2006

Related U.S. Application Data

(60) Provisional application No. 60/631,661, filed on Nov. 29, 2004.

(51) Int. Cl.
*G06G 7/50* (2006.01)
(52) U.S. Cl. ............................................. 703/9; 703/10
(58) Field of Classification Search ..................... 703/10
See application file for complete search history.

(56) References Cited

U.S. PATENT DOCUMENTS

| | | |
|---|---|---|
| 4,210,964 A | 7/1980 | Rogers et al. |
| 5,202,981 A | 4/1993 | Shackelford |
| 5,307,445 A | 4/1994 | Dalal et al. |
| 5,428,744 A | 6/1995 | Webb et al. |
| 5,499,371 A | 3/1996 | Henninger et al. |
| 5,684,723 A | 11/1997 | Nakadai |
| 5,710,726 A | 1/1998 | Rowney et al. |
| 5,794,005 A | 8/1998 | Steinman |
| 5,875,285 A | 2/1999 | Chang |

(Continued)

OTHER PUBLICATIONS

Reme et al ."Proceedings IWCP'99 Workshop" 1999 Springer.*

(Continued)

*Primary Examiner*—Kamini Shah
*Assistant Examiner*—Saif Alhija
(74) *Attorney, Agent, or Firm*—Christopher D. Northcutt; Richard J. Schulte

(57) ABSTRACT

The present invention provides a method, a system and a program storage device containing instructions for simulating the flow of fluid in a physical system using a composition-based extensible object-oriented program. A computer program includes: (i) a framework subsystem providing a graph package, a compute package and a property package; (ii) an engine subsystem including engine subsystem packages for performing numerical simulation, the engine subsystem packages including a linear solver package and a non-linear solver package; and (iii) a set of model components providing physical and numerical modeling behaviors utilized by the engine subsystem, the model components including at least one of a reservoir model, a well model, an aquifer model, a fluid model and a SCAL model. The framework subsystem, the engine subsystem and the model components work with one other to simulate the flow of fluid. Preferably, a partition package is used to create a partition of subsets of node and edge indices which can be used optimize computations by the program.

40 Claims, 13 Drawing Sheets

U.S. PATENT DOCUMENTS

| | | | |
|---|---|---|---|
| 5,905,657 | A | 5/1999 | Celniker |
| 5,913,051 | A | 6/1999 | Leeke |
| 5,914,891 | A | 6/1999 | McAdams et al. |
| 5,923,867 | A | 7/1999 | Hand |
| 5,953,239 | A | 9/1999 | Teixeira et al. |
| 5,963,212 | A | 10/1999 | Bakalash |
| 6,052,520 | A | 4/2000 | Watts, III |
| 6,052,650 | A | 4/2000 | Assa et al. |
| 6,078,869 | A | 6/2000 | Gunasekera |
| 6,108,608 | A | 8/2000 | Watts, III |
| 6,128,577 | A | 10/2000 | Assa et al. |
| 6,256,603 | B1 | 7/2001 | Celniker |
| 6,373,489 | B1 | 4/2002 | Lu et al. |
| 6,662,146 | B1 | 12/2003 | Watts |
| 6,928,399 | B1 | 8/2005 | Watts, III et al. |

OTHER PUBLICATIONS

VanderHeyden et al. "CartaBlanca—a pure-Java, component-based systems simulation tool for coupled nonlinear physics on unstructured grids—an update" 2003.*

Dittrich et al. "An Event and Repository Based Component Framework for Workflow System Architecture" Nov. 1999.*

J.W. Watts, "Reservoir Simulation: Past, Present and Future," SPE 38441, 1997 SPE Reservoir Simulation Symposium, Dallas, Texas, Jun. 8-11, 1997.

K.T. Lim, D.J. Schoizer, K. Aziz, "A New Approach for Residual and Jacobian Arrays Construction in Reservoir Simulators," SPE 28248 presented at the 1994 SPE Petroleum Computer Conference, Dallas, Texas, Jul. 31-Aug. 3, 1994.

Byer, T.J. et al, "Preconditioned Newton Methods for Fully Coupled Reservoir and Surface Facility Models", SPE 49001, Sep. 27, 1998, pp. 181-188.

Farkas, Eva, "Linearization Techniques of Reservoir Simulation Equations: Fully Implicit Cases", SPE 37984, Jun. 8, 1997, pp. 87-95.

Cao et al., 2002, "Performance of IMPSAT and IMPSAT-AIM Models in compositional simulation," SPE paper 77720, presented at the SPE ATCE, San Antonio, TX.

Centre for Integrated Petroleum Research, 2006, "Fluid flow description for transition zones" [online]. [Retrieved Nov. 11, 2008]. Retrieved from the Internet: <URL: http://www.uib.no/cipr/research/FluidFlowAndFaults/5FluidFlowDescription.htm>.

Chien et al., 1987, "The Use of Vectorization and Parallel Processing for Reservoir Simulation," SPE paper 16025, presented at the SPE Reservoir Simulation Symposium, San Antonio, TX.

Lim et al., 1994, "A New Approach for Residual and Jacobian Array Construction in Reservoir simulators," SPE paper 28248, presented at the SPE Petroleum Computer Conference, Dallas, TX.

Schlumberger Oilfield Glossary, 2003, "Special core analysis (SCAL)" [online]. [Retrieved Nov. 7, 2008]. Retrieved from the Internet: <URL: http://web.archive.org/web/20030101-20051129re__/http://www.glossary.oilfield.slb.com/Display.cfm?Term=special%20core%20analysis%20(SCAL)>.

Young et al., 1991, "Full-Field Compositional Modeling on Vector Processors," SPE paper 17803, SPE Reservoir Engineering.

Young et al., 1993, "Implementation of An Adaptive Implicit Method," SPE paper 25245, presented at the SPE Reservoir Simulation Symposium, New Orleans, LA.

B. Venners, 1998, "Inheritance versus composition: Which should you choose?" [online]. Retrieved from the Internet: <http://www.javaworld.com/jw-11-1998/jw-11-techniques.html.>.

* cited by examiner

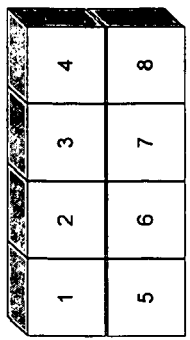

Fig 8
Simplified 2 Dimensional Reservoir Grid

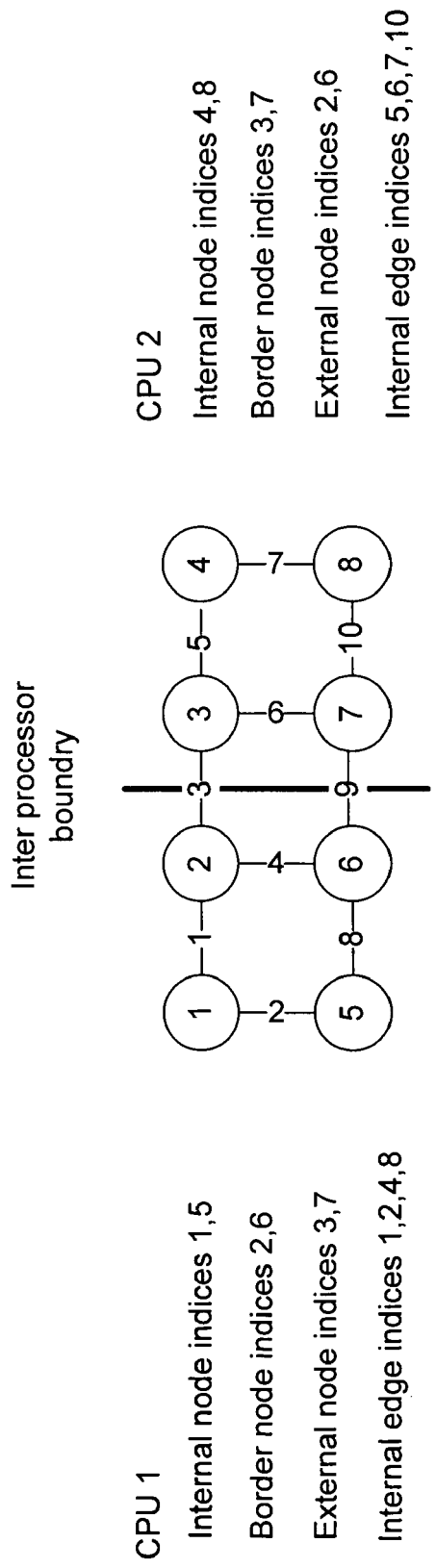

Fig 9
Parallel Graph Representation of Reservoir Cells based on Total Numbering of Nodes and Edges CPU 1
Internal node indices 1,5
Border node indices 2,6
External node indices 3,7
Internal edge indices 1,2,4,8
Border edge indices 3,9

CPU 2
Internal node indices 4,8
Border node indices 3,7
External node indices 2,6
Internal edge indices 5,6,7,10
Border edge indices 3,9

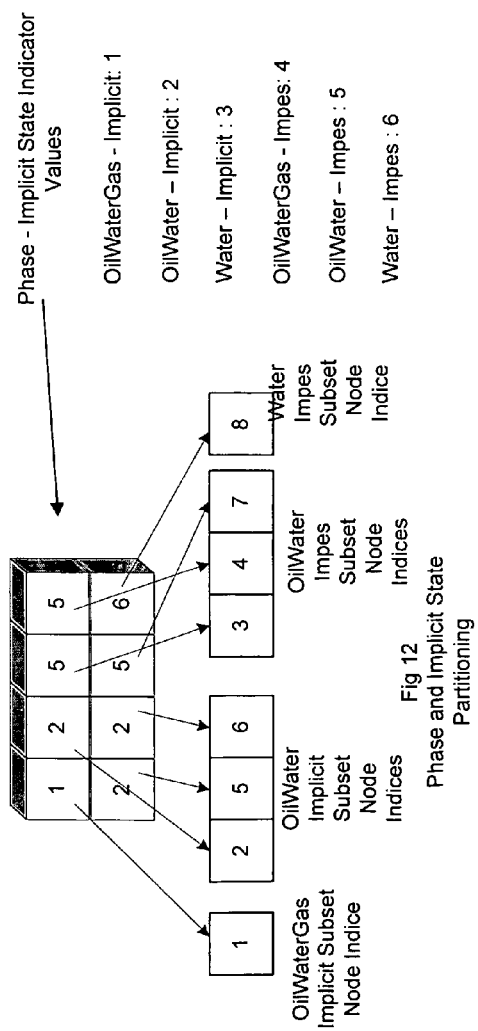

METHOD, SYSTEM AND PROGRAM STORAGE DEVICE FOR SIMULATING FLUID FLOW IN A PHYSICAL SYSTEM USING A DYNAMIC COMPOSITION BASED EXTENSIBLE OBJECT-ORIENTED ARCHITECTURE

This application claims benefit of U.S. Provisional Application No. 60/631,661, filed Nov. 29, 2004, which is incorporated by reference herein in its entirety.

BACKGROUND OF THE INVENTION

Hydrocarbon exploration and recovery rely on sophisticated means of reservoir modeling. Reservoir models can be used to understand geology and fluid flow, or predict future production using a variety of recovery mechanisms. General-purpose reservoir simulators are used to integrate geologic, petrophysical, fluid and well model descriptions with physical laws governing mass transport to support reservoir analysis and prediction. A good primer on the principles behind reservoir simulation is Aziz, K. and Settari, A., *Petroleum Reservoir Simulation*. Elsevier Applied Science Publishers, London (1979). Reprinted by Khalid Aziz and Antonin Settari, Blitzprint Ltd., Calgary, Alberta (2002).

Simulation of reservoir models requires solution of equations which govern conservation of mass and energy over time. The process of simulation involves solving the equations over discrete time intervals to monitor changes in reservoir properties. The equations incorporate transport, phase behavior, and reaction relationships from the petrophysical and fluid models. Spatial variations in reservoir properties require the equations to be spatially discretized in a way that corresponds to the grid geometry and topology. Time dependent terms require temporal discretization to monitor the accumulation of mass or energy at grid node locations throughout the reservoir. Spatial discretization methods are selected to ensure accurate representation of grid property heterogeneities.

Classical node-centered finite difference methods are common for reservoirs with continuous geology and mildly varying permeability. Variants of finite differences are used for grids associated with highly heterogeneous permeability fields. Complex geologic and fluid descriptions can result in a system of equations with millions of equations and unknowns. Stable Newton-like iterative methods are used to solve the nonlinear system and require efficient methods to build and solve the linear system. Adaptive implicit methods can be used to increase the computation efficiency of the Newton iterations by reducing the number of implicit variables and hence the size of the linear system. Young, L. C. and Russell, T. F.: "Implementation of An Adaptive Implicit Method", SPE paper 25245, presented at the SPE Reservoir Simulation Symposium, New Orleans, 1993. Selection of implicit and explicit nodes is designed to minimize the number of implicit nodes while ensuring the maximum stable timestep size. Cao, H. and Aziz, K.: "Performance of IMPSAT and IMPSAT-AIM Models in compositional simulation", SPE paper 77720, presented at the SPE ATCE, San Antonio, 2002. Current generation reservoir simulating architectures typically have a lifespan of at least 10 years. As a result, many of the simulators in widespread use have their roots in petroleum engineering, software engineering, and computing technologies that were originally targeted at structured grids and scalar architectures. Advances in software and hardware technologies, parallel computing, advanced gridding, and modern software engineering techniques have created new opportunities. At the same time, evolving workflows involving complex geological models, enhanced rock and fluid property models, large full-field simulations, near well studies, production and facilities optimization, and stochastic modeling have placed new demands on reservoir simulation technology.

Traditional languages, such as FORTRAN, used for the development of reservoir simulators have limited data modeling capability and are focused on following a set of pre-defined procedures to solve problems. More modern programming languages, such as C++, provide complex data modeling through an advanced data type system and are not limited to decomposing problems in terms of procedures. Additionally, C++ supports object-oriented paradigms which allow development of programs that integrate many components, having widely different behavior, data models, and performance requirements, while providing mechanisms for code reuse, maintainability and extendibility. These elements are critical to the success of a next generation reservoir simulator.

Although object-oriented design has been the main staple of software development for quite some time, its application to scientific programming has been hindered somewhat by the perceived inefficiency of run-time polymorphism. However, in recent years the emergence of compilers that are in full compliance with the C++ standard has made use of generic programming techniques commercially practical. Generic programming offers the benefits of encapsulation and code reuse without the overhead of virtual function calls. Austern, M. H.: Generic Programming and the STL—Using and Extending the C++ Standard Template Library, Professional Computing Series. Addison-Wesley, 1999. Alexandrescu, A.: Modern C++ Design: Generic Programming and Design Patterns Applied, Addison-Wesley, 2001. Object-oriented and generic programming techniques using C++ have been shown to be useful in the development of scientific and numerical applications. Barton, J. and Nackman, L.: Scientific and Engineering C+", Addison-Wesley, 1994.

Large-scale object-oriented frameworks for scientific computing have been developed in many contexts Henderson, M., Anderson, C., and Lyons, S. (eds): "Object oriented methods for interoperable scientific and engineering computation", Society for Industrial and Applied Mathematics, 1999. Parallelism has been addressed for example in the POOMA project. Oddham, J., "Scientific Computing Using POOMA", C++ Users Journal, November 2002. Object-oriented architectures for flow simulations have been developed in other industries. Langtangen, H. P.: Computational Partial Differential Equations, Numerical Methods and Diffpack Programming, Lecture Notes in Computational Science and Engineering, Springer-Verlag, 1999. These techniques have been applied to reservoir simulators by several practitioners within academia. Verma, S. and Aziz, K., "FLEX: an Object-Oriented Reservoir simulator," SPE paper 36007, presented at the Petroleum Computer Conference, Dallas, 1996. Verma, S.: "Flexible Grids for Reservoir Simulation", PhD Thesis, Department of Pet. Eng, Stanford University, 1996. Byer, T. J., Edwards, M. G. and Aziz, K.: "A Preconditioned Adaptive Implicit Method for Reservoirs with Surface Facilities," SPE paper 51895, presented at the SPE Reservoir Simulation Symposium, Houston, 1999. Nogaret, C., "Implementation of an Network-based Approach in an Object-Oriented Reservoir Simulator," Msc Thesis, Department of Pet. Eng., Stanford University, 1996. Parashar, M., Wheeler, A., Pope, G., Wang, K., Wang, P.: "A New Generation EOS Compositional Reservoir Simulator: Part II-Framework and Multiprocessing", SPE paper 37977, presented at the Reservoir simulation Symposium, Dallas, 1997. Also, these techniques have been applied in industry. Beckner, B. L., Hutfilz, J. M., Ray, M. B. and Tomich, J. F., "EM$^{power}$: New Reservoir Simulation System", paper 68116, presented at the SPE Middle East Oil show, Bahrain, 2001.

As new software development technologies are invented it is often the case that architectures that adopt these technologies first suffer for a variety of reasons. While the C++ language provides full support for object-oriented paradigms, a deep understanding of many concepts and techniques coupled with years of study and experiments are required to successfully design reservoir simulation architecture. The misuse of inheritance, a technique commonly associated with code reuse and extendibility, often leads to unnecessary complexity and a low rate of code reuse with increasing program requirements.

In traditional scientific programming languages, such as FORTRAN, the type system only supports basic types such as characters, integers, doubles, and arrays of the basic types. The C++ type system provides the ability to create user-defined types referred to as classes. Classes can be designed to contain data as well as methods for operating on the data. Classes define the structure of a type. Objects are instances of classes that contain the data and interact with other objects through composition and inheritance features of the language.

Inheritance among classes is based on an "is-a" relationship between a base class and a derived class. FIG. 1 shows a simple example of inheritance for a framework modeling device types in a pipe flow network program. The triangle symbol represents the inheritance from the base class to the derived class. The derived classes of network classes include Pipe, Valve, and Pump. These derived classes inherit features of the base class NetworkDevice. When a derived class inherits from a base class, all the functions and data members are inherited, although they may not all be accessible by the derived class. Code reuse is achieved through design of the base class, which defines the data and methods accessible by the derived classes. Additionally derived classes may be allowed to override base class methods to extend the behavior of an object. This means that class hierarchies that are designed to interact with NetworkDevice classes can support the addition of new derived classes without modification.

While the "is-a" relationship provides a simple rule for classification and results in rapid development of class hierarchies, as functional requirements of the program expand reliance heavily on inheritance can result in complex hierarchies that are difficult to reuse or extend. For example, a general-purpose pipe flow network program requires that devices can be connected to one another and that the network pressure drop be computed. However, determining the pressure drop between devices requires specific knowledge of the device types. FIG. 2 shows how the class hierarchy would be defined using inheritance where it is assumed that connection classes have access to the collection of NetworkDevice objects. The connection classes are labeled according to the type of devices connected. An ordered collection of Device-Connection objects is traversed to compute the system pressure drop without specific knowledge of the connection types. Now assume that the system temperature change needs to be computed and that some devices can compute temperature either with approximate or rigorous methods. The updated class hierarchy is shown in FIG. 3 where specialized classes are labeled according to the type of devices connected and the method for computing temperature, APM (approximate) or RGM (rigorous). The architecture is modified so that base and derived classes contain an additional compute method (delta_temp( )) and additional derived classes are implemented for those devices that support the two ways of computing temperature.

This example highlights several problems with inheritance based class hierarchies. First, the derived classes of DeviceConnection combine concepts of type of connection with computation type. For example, one type of connection is a "PipeToPipe" device connection. This type of connection is combined with the compute type (APM and RGM label). As a result of the combining of these concepts of physical type and compute type in derived classes, a disadvantageous complexity is created. The addition of new device and compute types will result in a combinatorial growth in the number of DeviceConnection derived classes and lead to an overly complex architecture. This could be avoided by placing limits on the number of device and compute types but the architecture cannot then be considered extendable.

Furthermore, while the same class structure is used to add new devices and compute types, the DeviceConnection architecture is not extendable without modification. The decision to include system behavior methods such as pressure and temperature change (i.e., delta_pres( ) and delta_temp( ) methods) directly in the hierarchy defining device connectivity (i.e., the class PipeToPipe defines a connection between two pipe devices) results in modifications to the DeviceConnection base class with the addition of new behaviors and leads to potentially monolithic base classes.

The use of inheritance-based architectures is found in previous reservoir simulator architectures such as in the programs of Nogaret and Verma, which were cited above. The architectures employ specialized connection classes that include variants for reservoir cell to reservoir cell, reservoir cell to well cell, or well cell to network device. Due to the research nature of the codes, provisions for computational options such as adaptive implicit, required of commercial simulators, were not included in the class hierarchy and thus limited the number of specialized connection classes.

U.S. Pat. No. 6,928,399 to Watts et al. employs the use of an inheritance-based architecture for reservoir simulation. Cell-Groups and ConnGroups are taught which are generalizations of the concepts taught by Nogaret and Verma. As an example, the ConnGroup class hierarchy is described and relies on inheritance wherein specialized classes combine multiple concepts, similar to the above example hierarchy in FIG. 3. In this particular case, the connection group class is labeled in terms of the model type (3 variants Well, Reservoir, and Facility) and solution type (3 variants-IMPES-IMPES, Fully-implicit-fully implicit and IMPES-fully implicit). This provides a combinatorial possibility of 3×3 or 9 connection group types. With addition of new models types such as aquifers or specialized reservoir models for dual porosity systems, along with additional solution types such as IMPSAT-fully-implicit, IMPSAT-IMPSAT, IMPSAT-IMPES, it will be appreciated that a combinatorial growth of ConnGroup specializations is likely with the inheritance based architecture.

There is a need for a parallel scalable reservoir simulation program based on an adaptable architecture containing a unified treatment of structured and unstructured grids which overcomes the limitations and problems associated inheritance based architectures. The present invention provides solutions to the above cited shortcomings.

SUMMARY OF THE INVENTION

The present invention provides a method, a system and a program storage device containing instructions for simulating the flow of fluid in a physical system using a composition-based extensible object-oriented program. The system can implement the method. The computer medium carries computer implementable instructions for carrying the method.

The method includes accessing a composition based extensible object oriented program. The program includes: (i) a framework subsystem providing a graph package, a compute package and a property package; (ii) an engine subsystem including engine subsystem packages for performing numerical simulation, the engine subsystem packages including a linear solver package and a non-linear solver package; and (iii) a set of model components providing physical and numerical modeling behaviors utilized by the engine subsystem, the model components including at least one of a reservoir model, a well model, an aquifer model, a fluid model and a SCAL model.

The engine subsystem creates a model object representative of the physical system. The model components cooperate with the framework subsystem to create graph objects, compute objects and property objects. The property objects have property values. By way of example, and not limitation, these may include phase, state, solution state, relative permeability, density, and viscosity. The graph objects represent nodes and edges modeling the physical system. The graph objects have node indices and edge indices used to access property values stored in the property objects and to navigate through the model objects. The compute object compute property values for the property objects by iterating over the indices in graph objects. The non-linear solver package can interact with the model packages and linear solver packages to simulate the flow of fluid through the physical system. This composition based extensible object oriented program is then run to simulate fluid flow in the physical system.

Ideally, the method further comprises providing criteria to define common characteristics of properties values. The framework subsystem further comprises a partition package. The model components utilize the partition package to create partition objects containing subset objects of node and edge indices, wherein each subset object corresponds to a common characteristic.

Also, preferably there is composition-based class hierarchy between at least one of the engine subsystem and the framework subsystem and the model components such that the at least one model component may be replaced without having to substantially modify the engine subsystem and the framework subsystem.

It is an object of the present invention to provide classes, which rather than combine concepts of "type of connections" with "computation type" maintain separation between "types of connections" and "computation type" thereby minimizing the combinatorial expansion which may occur when new "computation types" are added to a class hierarchy.

It is another object to add new compute classes (fluid density, internal energy, equation coefficients, etc.) to a reservoir simulator with a composition-based architecture that is extensible without modification to an entire hierarchy of classes.

It is a further object to provide a reservoir simulator that has dynamic partitioning of node indices based upon changing properties of the reservoir model over timesteps.

BRIEF DESCRIPTION OF THE DRAWINGS

These and other objects, features, and advantages of the present invention will become better understood with regard to the following description, pending claims, and accompanying drawings where:

FIG. 8 is a schematic view of a 2-dimensional grid of reservoir cells;

FIG. 9 is a parallel graph representation of the reservoir cells based on total numbering of nodes and edges;

FIG. 10 is schematic view of the grid of reservoir cells including phase state indicator values;

FIG. 11 is schematic drawing of the grid of reservoir cells including implicit state indicator values;

FIG. 12 is schematic drawing of the grid of reservoir cells including phase-indicator values which are arranged into a dynamic partition of subsets of indices;

DETAILED DESCRIPTION OF THE INVENTION

A. Introduction

The present invention provides solutions to the shortcomings cited in the background section by using the object-oriented technique of composition as the basis of class hierarchies, coupled with a different decomposition of the class architecture. Inheritance is an extremely tight coupling mechanism while composition is simply embedding a class within another class and therefore provides much greater control over the degree of coupling. The embedded class is called the implementation class while the composed class is called the interface class. This technique is often referred to as the handle/body or bridge pattern. The approach promotes clear specification of the roles and responsibilities of the interface class, insulates clients of the architecture from changes in the implementations and results in a simpler architecture. A composition-based hierarchy can easily support dynamic configuration of program behavior to optimize the configuration of computation classes for different reservoir models. Additionally, by using a different class architecture that avoids the mixing of concepts in class specifications, class hierarchies are designed to maximize code reuse and minimize the impact of future requirements on the program architecture.

B. Concept of Compositional Class Hierarchies

Figure 1:
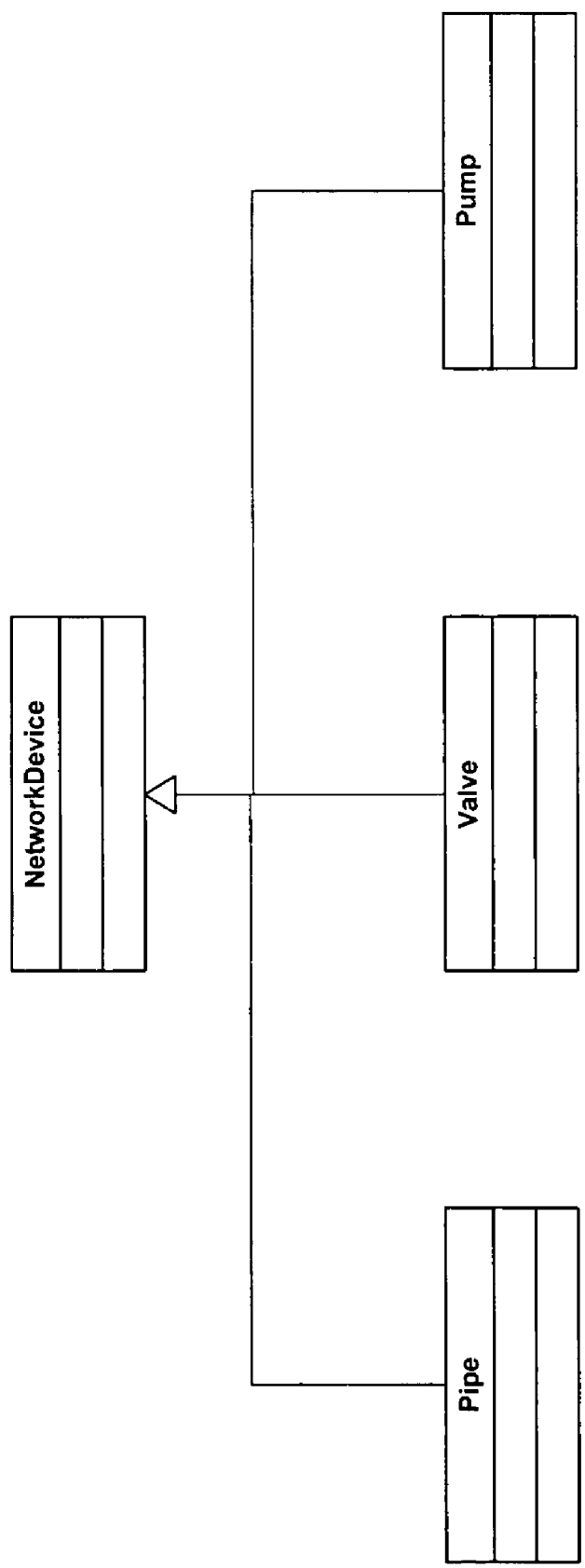
FIG. 1 is a flowchart of a base class NetworkDevice and classes of device types derived through inheritance from the base class.
Figure 2:
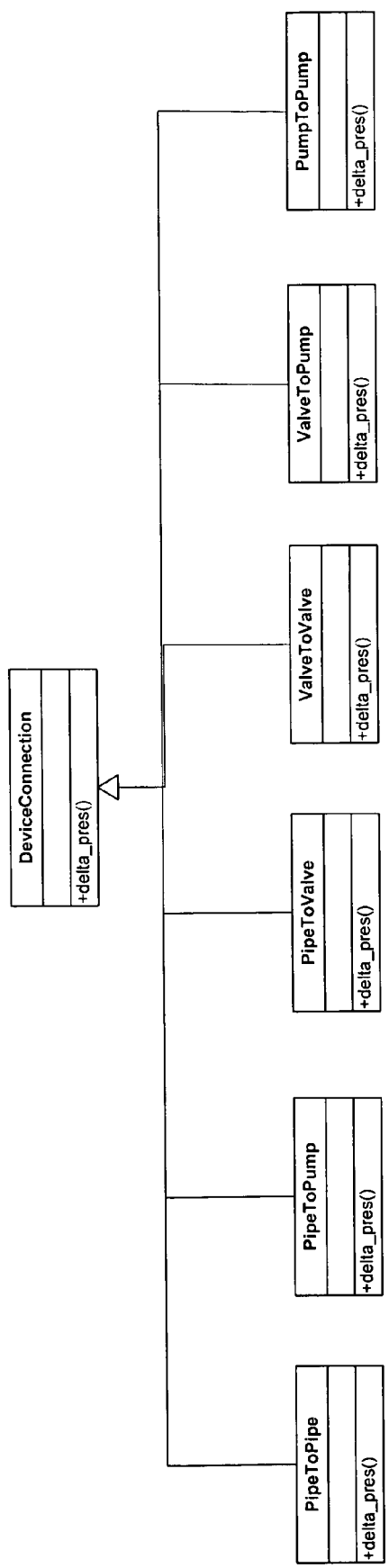
FIG. 2 is a flowchart showing a DeviceConnection base class with a compute method (+delta_pres) and numerous derived classes of connection types that connect the device types of FIG. 1.
Figure 3:
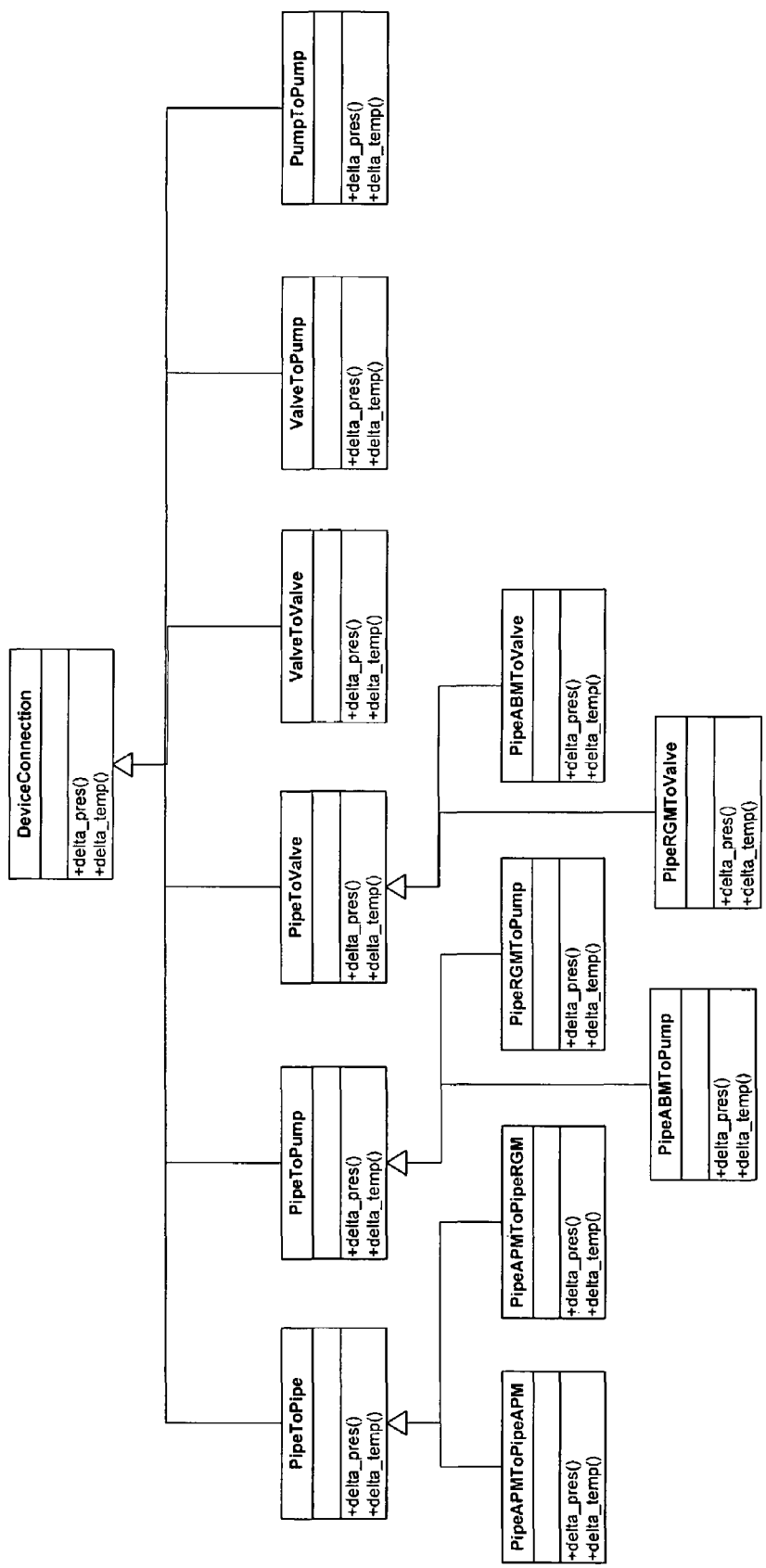
FIG. 3 is a flowchart showing a DeviceConnection base class and derived classes of DeviceConnections, similar to that of FIG. 2, wherein an additional compute type, i.e., APM or RGM, has been added to the DeviceConnections resulting in (a) a combinatorial expansion of total derived classes and (b) modification of each base and derived class due to the adding of the additional compute method to each of the DeviceConnection classes.
Figure 4:
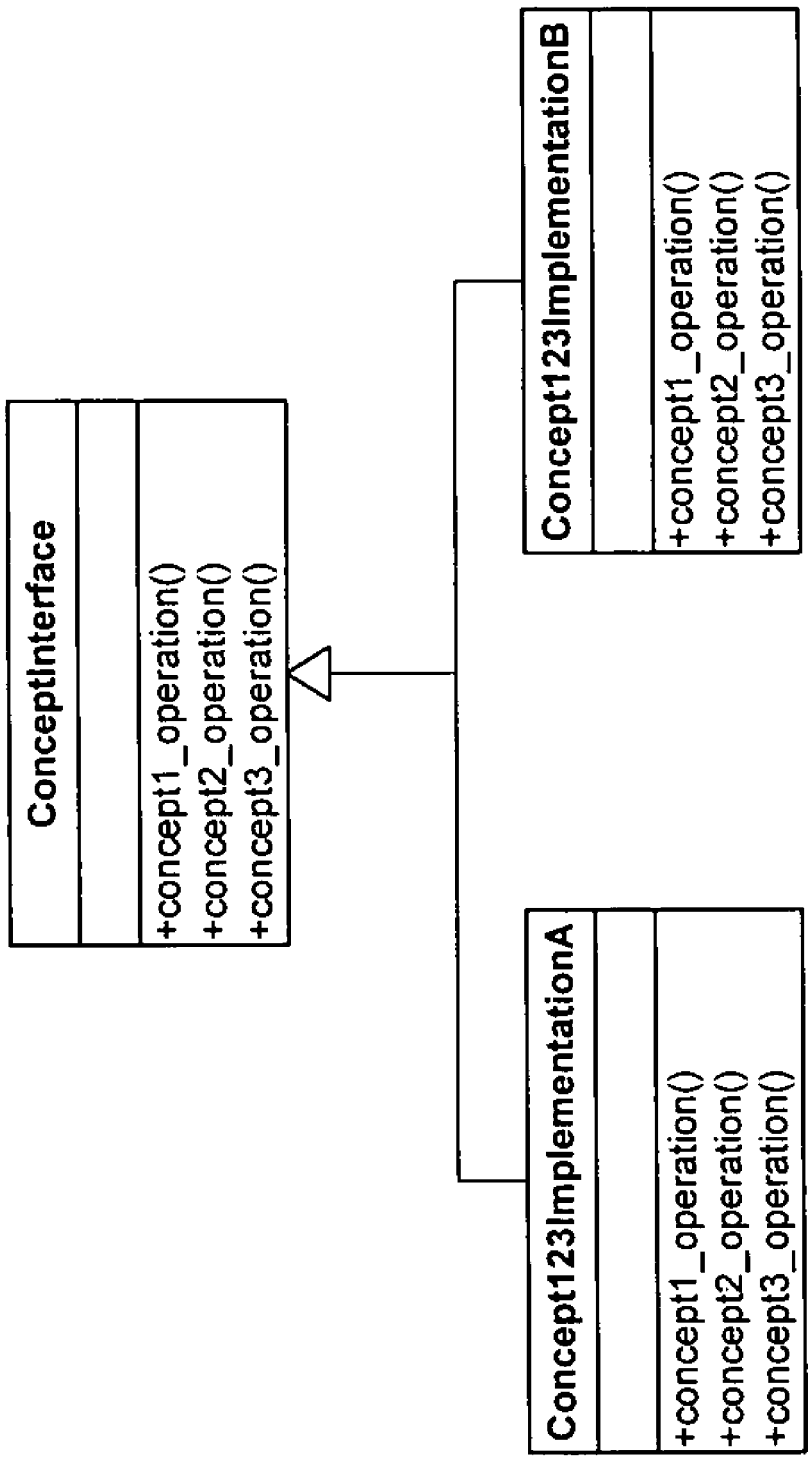
FIG. 4 is a flowchart demonstrating a base class with a large number of unrelated functions which can lead to a combinatorial growth of classes.

FIG. 4 shows a generalized interface class, ConceptInterface, which defines a number of methods or behaviors, i.e., +concept1_operation( ), +concept2_operation( ) and +concept3_opertion( ). Derived from this base class are Concept123ImplementationA and Concept123ImplementationB. The methods or behaviors of these derived classes are specializations of the methods or behaviors of the base class. The architecture of the present invention seeks to minimize the numbers of methods or behavior found in interface classes. The large number of method or behaviors in an interface class can lead to base classes with many unrelated methods and no true assignment of responsibilities other than to contain operations of all possible behaviors. The classes implement methods for all three operations, but the details of one or more of the operation methods are different, hence requiring separate classes. For example, Concept123ImplementationB may only change the way concept1_operation( ) is implemented. If all concept operations had two different implementations this would lead to eight specializations of the ConceptInterface. Increasing the number of concept operations, (i.e., addition of a concept4_operation( )), coupled with different implementations for each concept operation can lead to a combinatorial growth of classes.

Figure 5:
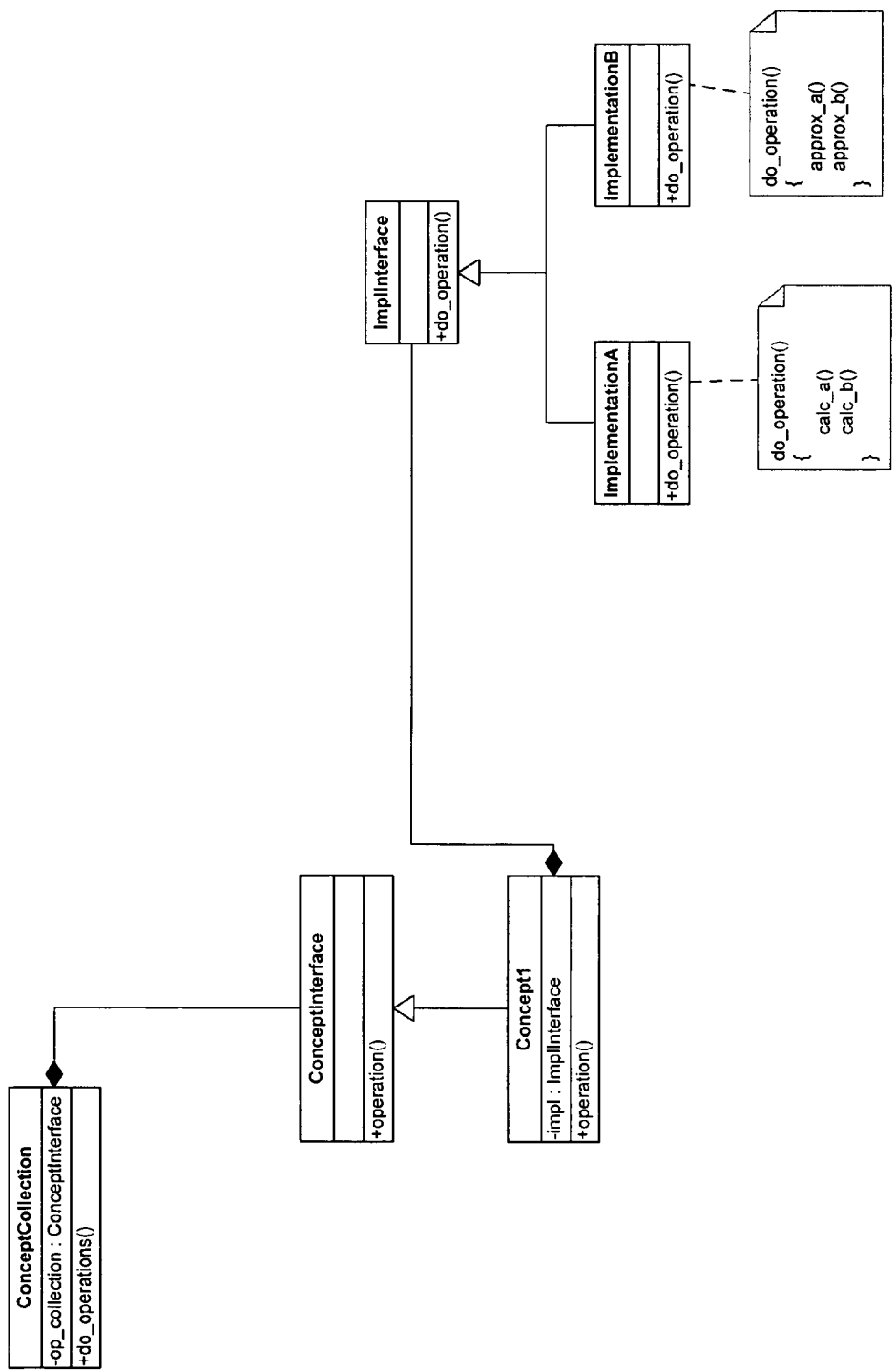
FIG. 5 is a flowchart illustrating the use of composition in an object-oriented class hierarchy to insulate architecture from a combinatorial expansion.

FIG. 5 demonstrates the advantages of using composition-based architectures with interfaces rather than using strictly inheritance-based class hierarchies. A ConceptCollection class is shown with a data member "op_collection" that may contain one or more objects of type ConceptInterface. The "do_operations" method is exposed to client code. Inherently derived from the interface class is a general Concept 1 class which composes an ImplInterface class. Inherently derived from the ImplInterface class are an ImplementationA class and an ImplementationB class, each of which have a do-operation method or behavior.

An example of composition is provided in FIG. 5. Class Concept1 composes class ImplInterface and contains data member "impl" of type ImplInterface, i.e., it is embedded in class Concept1. Concept1 class only has one method and is designed to clearly provide a specific behavior rather than numerous methods of exporting different behaviors, which may have complex interactions. The implementation class for Concept1 must adhere to the interface defined by class ImplInterface. This provides the benefits of (1) insulating clients of Concept1 from changes in the details behind the "do_operation" methods, and (2) allowing Concept1 class to be dynamically configured with different specializations of the ImplInterface class, as will be demonstrated next.

Calls to the "operation" method of class Concept1 are forwarded to the impl's method "do_operation" where the operation is performed. (1) The forward inside the "operation" method has the form "impl->do_operation"; (2) The only coupling between classes Concept1 and ImplInterface is in the above forwarding operation; (3) The ImplInterface class may have other methods; however in this example Concept1 class only exposes the behavior of the "do operation" method to its clients. Implementations of ImplInterface can have different methods for providing the behavior required of the "do_operation" method. The ImplInterface provides stability in clients of Concept1 classes by decoupling implementation details for the exposed interface "operation".

Figure 6:
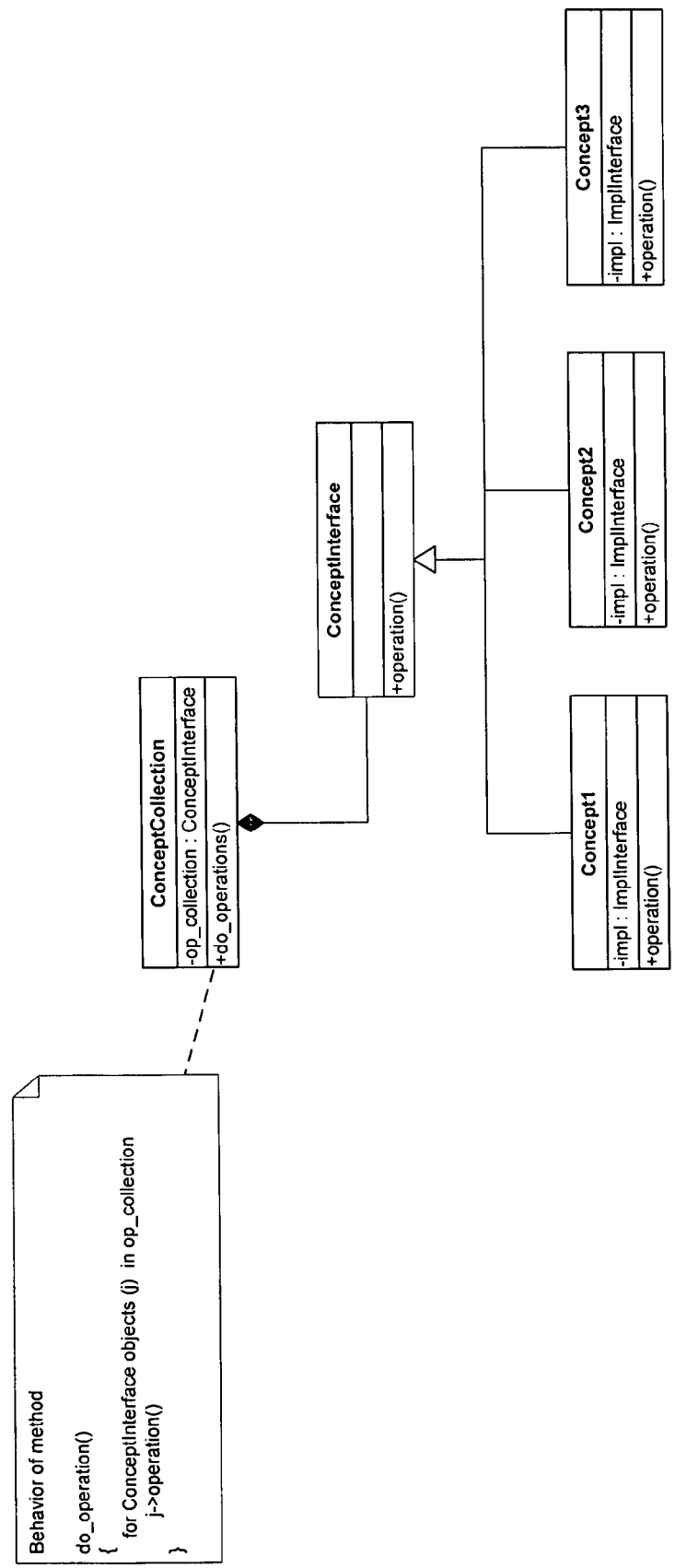
FIG. 6 is a flowchart illustrating the concept of composition used to insulate architecture from a combinatorial expansion.

FIG. 6 shows ConceptCollection can compose one or more objects of type ConceptInterface to expose a collection of behaviors with one method labeled "do_operations". This has the benefits of (1) code reuse, for example one client may require behavior from only Concept1 and Concept2 classes while another client may require the behavior from all three Concept classes and (2) supporting future behaviors through new implementations of the ConceptInterface class without modification of the ConceptCollection, ConceptInterface or ImplInterface classes.

C. Dynamic Composition-Based Object-Oriented Reservoir Architecture

In order to overcome the shortcomings in previous inheritance based architectures, the present invention implements an architecture which preferably has one or more of the following features:
 parallel scalability;
 the ability to handle large and/or complex reservoir;
 unified treatment of structured and unstructured grids;
 support for different property models and numerical solution methods;
 a software architecture that can accommodate future modeling requirements and solution techniques.

To maximize the speed of simulation, it is highly desirable that a simulator be able to make effective use of SPMD (Single Program Multiple Data) computer architectures. Programming for these architectures is inherently more complex than serial programming. In addition, the parallelism in the reservoir simulation problem is intrinsically more complicated that in many other domains. In the past, most applications have been designed as serial code and then ported to parallel platforms later in their lifecycle. This generally involves considerable refactoring and suboptimal parallel performance. The present architecture and associated algorithms have been built to run in parallel from the outset.

The present invention uses object-oriented and generic programming capabilities of C++ to maximum reuse and extensibility with minimal losses of computational efficiency. The method comprises an architecture developed by analysis of the structural and functional requirements for reservoir simulation and results in a general-purpose program for modeling physical behavior of hydrocarbon fields. In a structural decomposition, the reservoir simulation problem is viewed in terms of loosely coupled physical parts with well-defined boundaries, such as reservoirs, wells, and aquifers. In a functional decomposition, reservoir simulation is viewed in terms of the engineering requirements to achieve modeling objectives such as predicting production or studying the displacement efficiency of enhanced oil recovery mechanisms that requires specialized property modeling. The functional decomposition is not only associated with engineering requirements, but with the analysis of numerical algorithms to provide points of flexibility or efficiently solve large problems in parallel computing environments.

Figure 7:
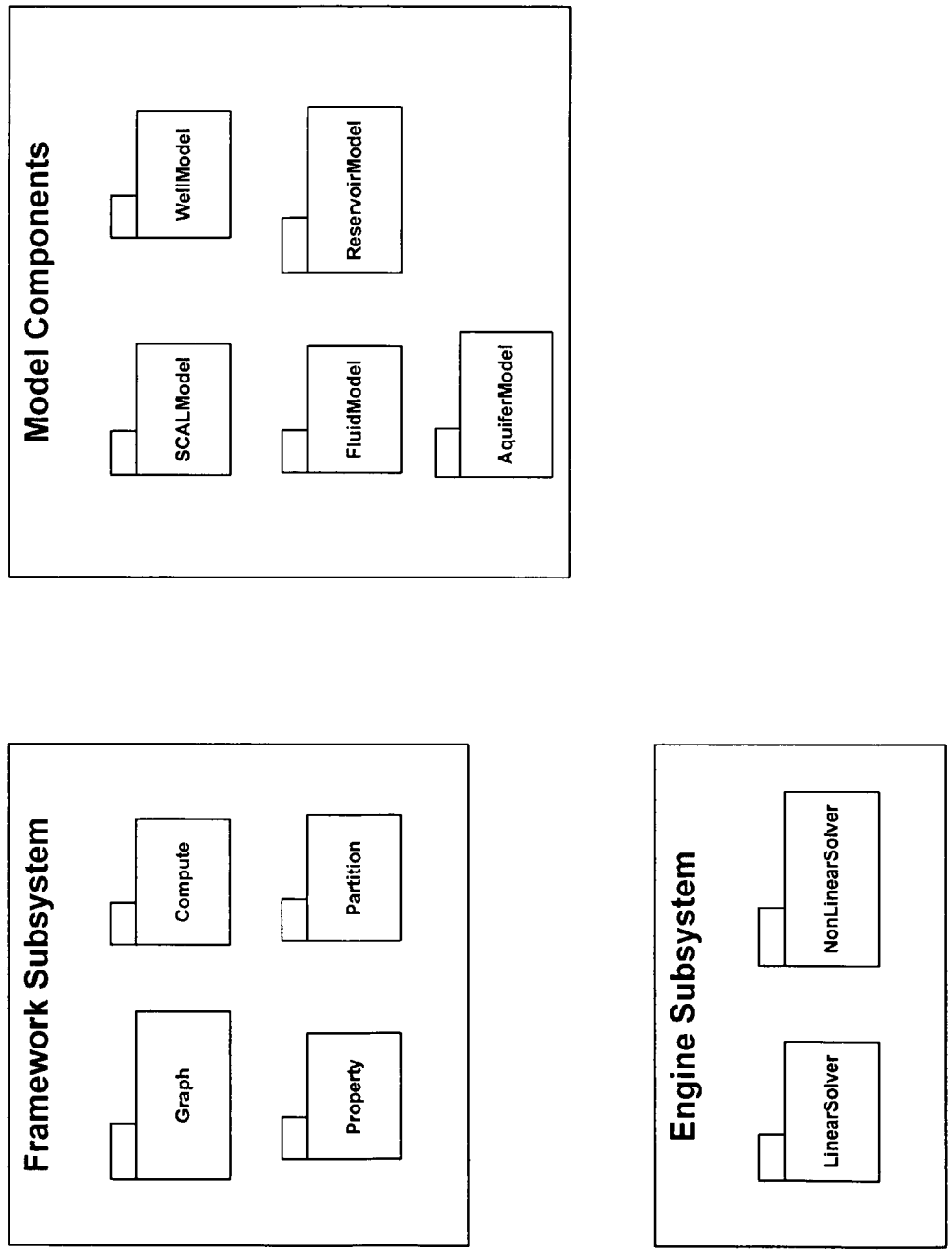
FIG. 7 is a schematic drawing of a reservoir simulation architecture, made in accordance with the present invention, which utilizes a framework subsystem, model components and an engine subsystem to simulate the flow of fluid in a physical system.

FIG. 7 shows a high level view of how the architecture is split into subsystems and components. Subsystems contain packages, which represent collection of classes designed to provide a specific functionality. The Framework subsystem is responsible for providing graph, property, partition, and compute packages that are used in other subsystems and components. The Engine Subsystem includes packages required for solving the numerical simulation problem, such as a linear solver and a non-linear solver. The Model Components are derived from structural and functional analysis and represent real-world entities such as reservoirs and fluids. Model components provide physical and numerical modeling behaviours utilized by the Engine Subsystem. The Model components represent high-level points of flexibility where a component can be replaced by another component containing more rigorous mathematical algorithms for physical property calculations or more accurate representation of transport equations. The details of each subsystem are described next.

The Graph package provides a ParallelGraph class to represent connectivity information arising from the physical or numerical system. Use of a graph structure to represent abstractions in the solution of partial differential equations has become widespread in the scientific community Schloegel, K., Karypis, G. and Kumar, V.: "Graph Partitioning for High Performance Scientific Simulations", in *CRPC Parallel Computing Handbook*, eds. J. Dongarra et al., Morgan Kaufmann (2000). Typically, connectivity information includes representation of the system in a distributed computing environment where parts of the system are stored on separate processors and computation required by numerical algorithms is allocated to CPU's in the environment.

A simplified reservoir with 8 reservoir cells is shown in FIG. 8. A ParallelGraph object is used to represent reservoir grid cells and connections between cells. The cells are referred to as nodes and connections between cells are referred to as edges. The numbering order of the nodes and their connectivity are determined externally and are provided to the ParallelGraph object. The numbering order values are commonly referred to as node or edge indices. For structured and unstructured grids, the number of edges is a function of the number of faces associated with a cell. For example, in the two-dimensional structured reservoir grid shown in FIG. 8, each node would have at most three edges to adjacent cells. Internally, a ParallelGraph class has data members defining the total number of nodes and edges, lists defining all the edges, or all edges associated with a node, along with methods to access the node and edge index information.

The ParallelGraph class defines data member and methods to support a distributed undirected or directed graph representations. Undirected graphs do not define edges based on direction, where directed graphs define two edges for each cell face. FIG. 9 shows distributed undirected graph representation for a two CPU decomposition of the reservoir grid in FIG. 8. The ParallelGraph class defines data members to represent nodes and edges in terms associated with the distributed problem, internal nodes (circles in diagram) are not connected to any node on another CPU, border nodes are connected to nodes assigned to another CPU, and external nodes are those nodes assigned to another CPU but are connected to nodes on the present CPU and have a representation on the present CPU. External nodes are also commonly referred to as overlap cells and may be useful for numerical solution techniques. Similarly internal edges are connections between internal and border nodes, border edges are connect border with external nodes and, for directed graphs; external edges connect external with border nodes. The ParallelGraph class provides methods to access internal, border, and external node or edge indices and maintains mappings between local and global index assignments. Global index labeling uses a numbering system based on all the nodes or edges in the system as is shown in FIG. 9, while local index labeling uses a numbering system based only on the number of internal, border, and external nodes or edges associated with that CPU.

Additionally the Graph package provides classes to link graphs associated with different types of components such as reservoir and wells, wherein the complication arises due to different graphs having different node or edge indices representing the same cell or cell connection. The link classes define mappings between the index ordering of common nodes or edges and provide methods to determine the index value associated with one graph's index ordering, from the index value of another graph.

In contrast to other prior art methods or architectures that mix concepts in the class design, such as the connectivity defined terms of the physical or numerical system, the ParallelGraph class does not contain any information associated with the physical or numerical system and can be reused to represent other system's connectivity, such as multi-segment well models or complex discretization stencils for more accurate numerical flow modeling.

The Property package provides generic ParallelProperty classes that store node or edge property values associated with the ParallelGraph. Generic classes contain the data attributes and methods associated with standard class descriptions, along with additional template parameters. The technique allows parameters to take on different values as long as contracts between the class and type are maintained. The ParallelProperty class is templated on the type of data being stored, such as integer, double or character string. Properties associated with a reservoir grid typically require precise representation and are stored as doubles or floats, while discrete information such as type of phases present in the cell or degree of implicitness as associated with a reservoir cell, are stored with integer types. The ParallelProperty class uses the ParallelGraph class to determine the number of elements that need to be stored, which may include elements representing values of the overlapping cells. The ParallelGraph contains information about the distributed graph that is used when values of the overlapping nodes require updating. The generic class representation allows the same ParallelProperty class to be reused for storing properties of different types, which increases code maintainability by reducing the instances of specialized classes.

Figure 13:
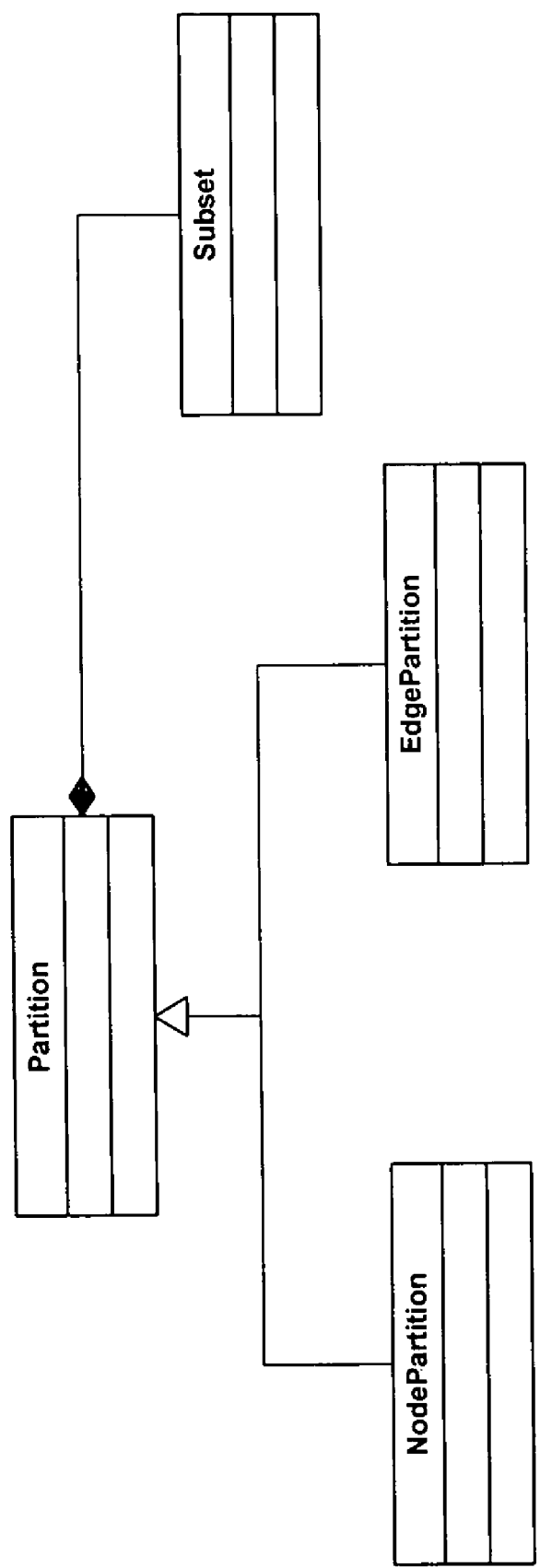
FIG. 13 is a schematic drawing of a partition base class having derived classes of NodePartition and EdgePartition and a composed class of subset indices.

The Framework subsystem also provides a Partition package that provides classes for constructing views of the ParallelGraph which may be more suitable for a particular numerical algorithm or external visualization package. Partitioning requires defining characteristics from one or more node or edge properties to categorize node or edge indices. Node and edge indices belonging to the same category are collected into subsets. Characteristic values are not limited to values from ParallelProperty objects but may be computed from other property values. As an example of the partitioning process, FIGS. 10 and 11 show the values of ParallelProperty objects representing the reservoir cell phase and implicit state. Knowledge of the node indices with the same phase and implicit state is commonly used to increase the computational efficiency of an algorithm. Young, L. C.: "Full-Field Compositional Modeling on Vector Processors," SPE paper 17803, SPERE, February 1991. Chien, M. C. H., Wasserman, M. L., Yardumian, H. E., Chung, E. Y.: "The Use of Vectorization and Parallel Processing for Reservoir Simulation", SPE paper 16025, presented at the SPE Reservoir Simulation Symposium, San Antonio, 1987. Lim, K. T., Sciozer, D. J. Aziz, K.: "A New Approach for Residual and Jacobian Array Construction in Reservoir simulators", SPE paper 28248, presented at the SPE Petroleum Computer Conference, 1994, Dallas. FIG. 12 shows how combined phase and implicit state indicators are defined and their values associated with the reservoir cells. All the node indices associated with a common phase and implicit state characteristic are collected and stored together. FIG. 12 shows the class hierarchy consisting of a Partition class with specializations of node and edge indices, and a Subset class that stores the indices values. In FIG. 13, the line with a diamond attaching the Partition and Subset class indicates that a Partition object may contain more than one Subset object. The Partition object maintains the association between characteristic type and Subset object and for this example the Partition object contains 4 Subset objects. Additionally the Partition objects contain methods for accessing the Subset objects and their characteristic type. The Partition class does not contain information defining the index context, for example node or edge, and the NodePartition and EdgePartition classes are nonlimiting examples of how the Partition class can be reused and specialized with context. Similar to ParallelGraph objects, the Partition objects do not contain concepts related to the physical or numerical system.

Figure 14:
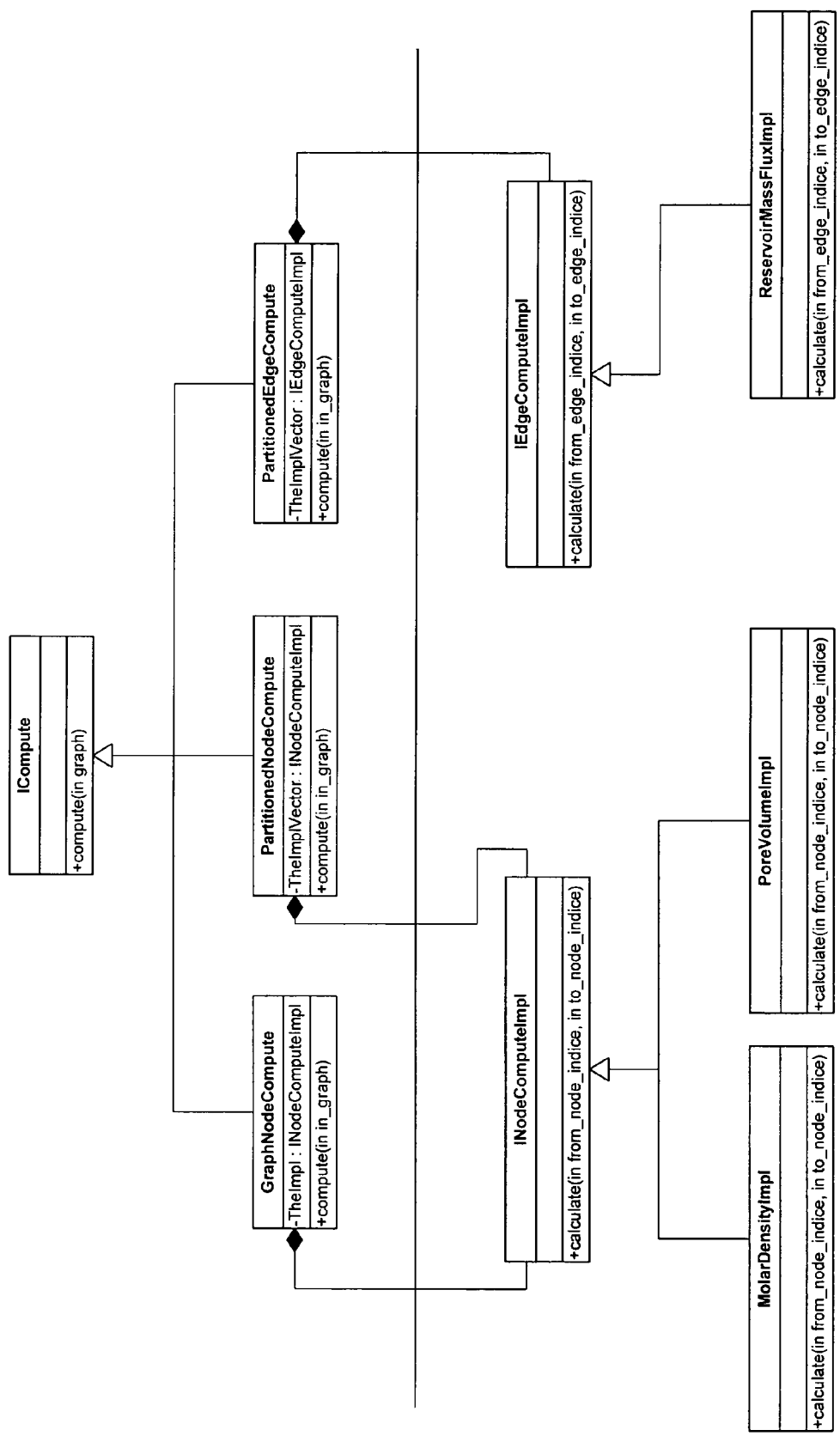
FIG. 14 is a schematic drawing of an ICompute base class have derived classes of GraphNodeCompute, PartitionedNodeCompute, and PartitionedEdgeCompute composed of indexing classes with derived classes that can be readily modified without affecting the architecture of the classes there above.

The construction of the system of equations for simulating flow through porous media requires computing petrophysical and fluid properties. By way of example and not limitation, such properties may include saturation or relative permeability. The specific properties and computational method depends on the type of reservoir and simulation objectives. The requirement to support numerous types of property calculations has the potential to result in a tightly coupled program where changes in property calculation require code modifications throughout the program. The present invention uses the object-oriented technique of composition to separate the interface of a property calculation from the implementation. Composition has the added benefit that when combined with the object-oriented strategy pattern property calculations can be combined to provide more complex behavior. Gamma, E., Helm, R., Johnson, R. and Vlissides, J: "Design Patterns: Elements of Reusable Object-Oriented software", Addison-Wesley, 1994, FIG. 14 shows representative compute interfaces defined by Compute package of the Framework Subsystem. The ICompute class is a pure virtual interface with no methods implemented by the class. It has the primary responsibility of defining the methods that give the interface identity. An interface class defines a contract that has to be carried out by objects implementing the interface. In addition to other methods for configuration of compute classes, the ICompute class defines a compute method, which includes a ParallelGraph input parameter. The Compute package provides specialized GraphNodeCompute, PartitionedNodeCompute, and PartitionedEdgeCompute implementations of the ICompute interface for node and edge property calculations; specializations are not limited to computations on nodes or edges. The GraphNodeCompute provides a concrete implementation of the compute method and also contains a data member labeled "The Impl" of type INodeComputeImpl. The GraphNodeCompute's compute method takes the graph object and uses methods on the graph object to get index values for the first and last nodes in the graph, and then calls TheImpl's "calculate" method, passing index values as parameters. FIG. 14 shows nonlimiting examples of INodeComputeImpl class specializations for fluid density and pore volume calculations provided by FluidModel and SCALModel components.

The GraphNodeCompute class is an example of object-oriented composition where one class composes another to achieve the desired behavior. Changes to the INodeComputeImpl interface do not propagate beyond the GraphNodeCompute class, thereby guaranteeing stability of client code using the ICompute interface. Implementations of the interface perform computations associated with ParallelGraph representations of a system; however each may have different data requirements and computational complexity.

To increase the computation efficiency of certain property calculation methods it is beneficial to organize the computations based on a partitioning of the graph that may change with time. The Compute package provides dynamic composition based class specializations of the ICompute interface to fill this need. For example in a reservoir may contain oil, water, and gas phases, the computation of phase fluid density should be targeted to those cells only containing that phase. The Compute package provides a PartitionedNodeCompute implementation of the ICompute interface that fulfills that requirement; other specializations for edges are also available. The PartitionedNodeCompute object contains a collection of INodeComputeImpl objects, each of which is associated with a particular phase state characteristic. When the PartitionedNodeCompute object's "compute" method is called, a NodePartition (see Partition package) object is accessed. The NodePartition contains subsets of indices, each subset containing indices for all cells with a common characteristic, which in this example is phase state. For each subset in the partition, the INodeComputeImpl object associated with the characteristic is located and the INodeComputeImpl object's calculate method is invoked with the associated subset's node indices, thereby avoiding unnecessary computation.

Figure 15:
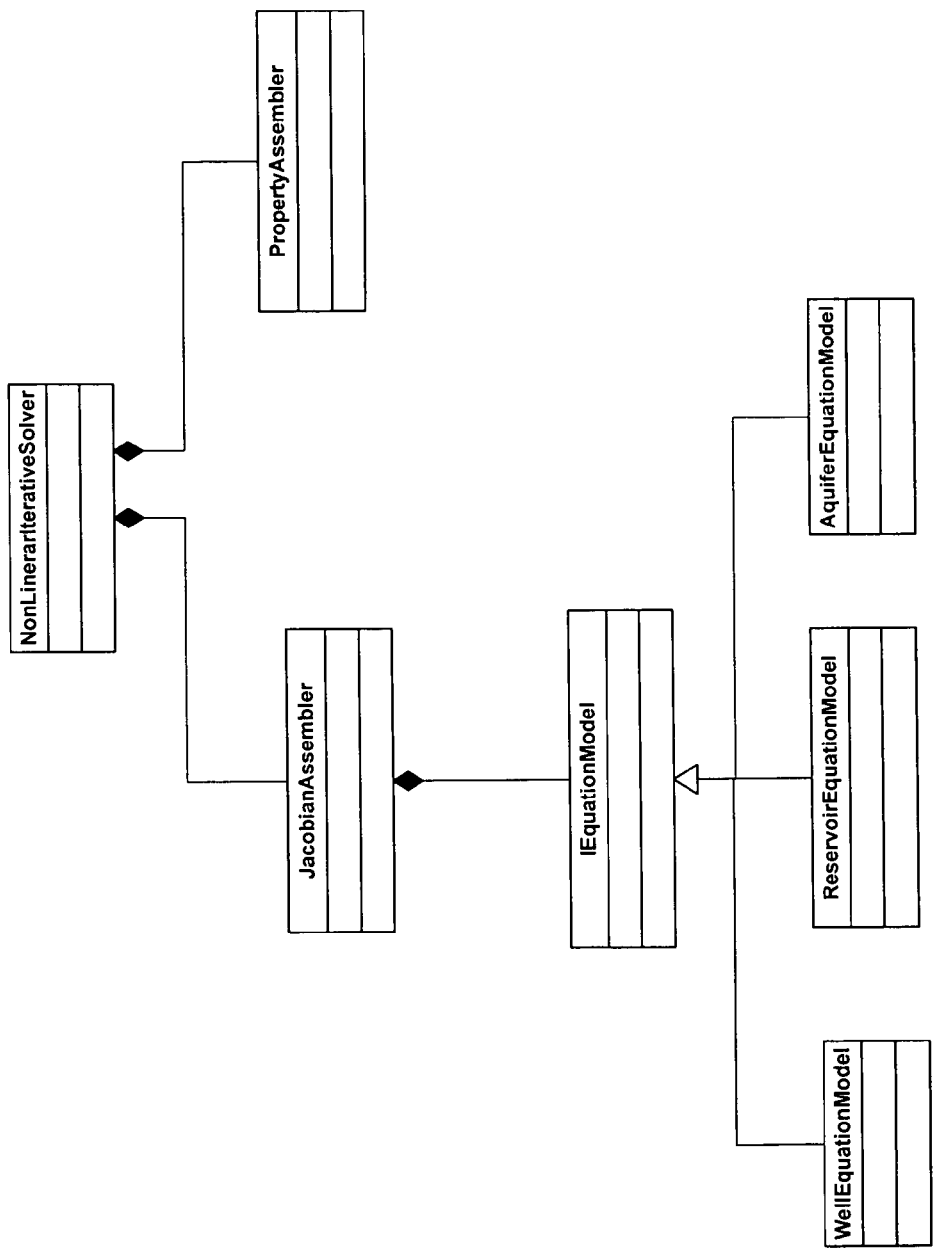
FIG. 15 is a flowchart of a NonLinearIterative Solver composed of JacobianAssembler and PropertyAssembler classes with the JacobianAssembler class further composing an lEquationModel class from which a number of EquationModel classes are derived.

The Engine subsystem defines interfaces required to integrate Model Components into the reservoir simulation program and provides packages common to the requirements of solving nonlinear partial differential equations. The NonLinearSolver package contains NonLinearIterativeSolver, PropertyAssembler and JacobianAssembler classes and also defines an IEquationModel interface that is implemented by components such as reservoir and well, as shown in FIG. 15. The PropertyAssembler contains lists of ICompute objects that are executed at different stages of the nonlinear solution processes to ensure that the correct physical property values are available as required. The JacobianAssembler is responsible for assembling the Jacobian matrix and residual vector.

Figures 16, 17:
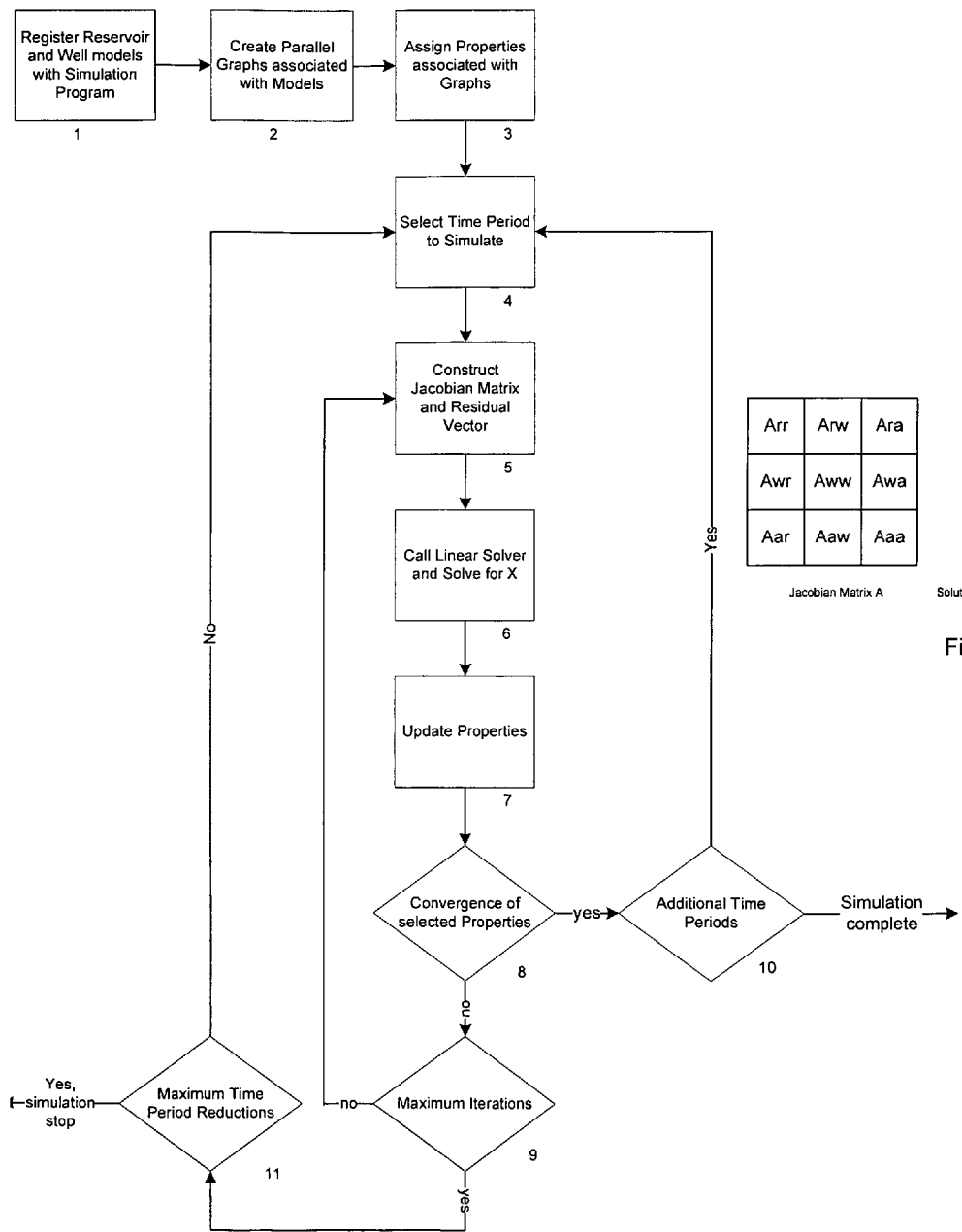
FIG. 16 is a flowchart of the operation of the reservoir simulator using the object-oriented composed dynamic architecture of the present invention.
FIG. 17 shows a schematic drawing of Jacobian matrix A, a solution vector X and a residual vector R.

The NonLinearIterativeSolver object uses variants of Newton's method to solve the nonlinear system. FIG. 16 is a flowchart representative of the simulation program using Newton's method and is used to highlight the types of interactions of Model Components with the Engine subsystem. Those skilled in the art of reservoir simulation will be familiar with those steps and thus the steps shall not be discussed in detail. Step 1 is performed when the simulation program starts and allows the components to register implementations with respective Engine objects. For example as shown in FIG. 15, the JacobianAssembler contains a collection of IEquationModel objects, reservoir, well and aquifer components register their implementations of the IEquationModel interface with the JacobianAssembler. Similarly, the components register ICompute objects, obtained from components such as FluidModel or SCALModel, with the PropertyAssembler class to ensure that physical properties are available to construct the transport equation coefficients.

Once component registration is complete, parallel graphs, not limited to the reservoir or well grids, are constructed (Step 2) and these graphs are linked together as required by the transport processes being modeled. Step 3 involves assigning properties associated with graphs. The model representing the physical system in the simulated overtime in Step 4. FIG. 17 shows a representative Jacobian matrix generated by the JacobianAssembler object during Step 5. The matrix A contains 9 submatrices, Arr represents only coefficients from terms associated with linearized reservoir transport equations, while Arw represents terms arising from reservoir well coupling, and similarly Ara represents reservoir aquifer coupling. The IEquationModel class defines interfaces used by the JacobianAssembler to collect block matrix elements for assembly into a complete matrix. The JacobianAssembler uses link information from the ParallelGraph objects to update submatrices such as Arw, where the reservoir transport equations may include terms for wells connected to the reservoir.

IEquationModel implementations abstract computations required to assemble sub-matrice elements from the JacobianAssembler, providing the flexibilities such as the ability to replace a prototyping implementation, which may be slower due to enhanced validity checking, with a computationally efficient implementation. The IEquationModel implementation ReservoirEquationModel provided by the ReservoirModel component uses a parallel graph representation of the cell connectivity along with classes provided by the Partition package to construct of the Jacobian submatrix Arr. Similar to the concepts previously shown for phase state partitioning used with property calculations, phase and solution state partitioning are used to increase the efficiency of transport equation coefficient calculations. The partition characteristic defined by the combined phase and implicit state of a node is used to generate subsets of edge indices. For example in a system that may contain oil (O), water (W), and gas (G) phases, where the linear system unknowns for a node may consist IMPLICIT, IMPES, or IMPSAT variable sets, an EdgePartition object (FIG. 13) is created, where the characteristics are defined as edges connecting nodes with the same phase and implicit state, different phase state but same implicit state, or different phase and implicit state. The ReservoirEquationModel object uses a PartitionedEdgeCompute object, which contains ReservoirMassFluxImpl objects, each corresponding to a specific edge characteristic value. While there could be many instances corresponding to all possible combinations of characteristic type, only one ReservoirMassFluxImpl class is required. Instances of the class are created with knowledge of characteristic type and are designed to be reused for all combinations of characteristic types and can easily be extended to accommodate additional phase and implicit types. Steps 5-9 show an iteration which is followed until a convergence criteria is met.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for simulating the flow of fluid in a physical system using a composition-based extensible object-oriented program, the method comprising the steps of:

(a) accessing the composition-based extensible object-oriented program, the program comprising:

(i) a framework subsystem comprising a graph package which comprises one or more graph package classes for representing one or more edges and one or more nodes of one or more grid cells used for modeling the physical system, a compute package which comprises one or more compute package classes for computing property values, and a property package which comprises one or more property package classes for storing node or edge property values associated with the one or more grid cells;

(ii) an engine subsystem comprising one or more engine subsystem packages for performing numerical simulation, the engine subsystem comprising a linear solver package and a non-linear solver package; and (iii) one or more model components providing physical and numerical modeling behaviors utilized by the engine subsystem, the one or more model components comprising at least one of a reservoir model, a well model, an aquifer model, a fluid model and a SCAL model;

wherein the one or more model components comprises an interface class;

wherein said interface class of said one or more model components composes one or more interface implementation classes;

wherein the one or more model components have a composition-based relationship with at least one of the framework subsystem and the engine subsystem;

wherein a call from at least one of the framework and the engine subsystem to said interface class of said one or more model components to perform an operation is forwarded to said one or more interface implementation classes of said one or more model components, thereby maintaining separate the type of connection of said interface class of said one or more model components from the computation type of said interface class of said one or more model components;

wherein the engine subsystems creates one or more model objects representative of the physical system;

wherein the one or more model components communicates with the framework subsystem to create instances of the graph package classes, thereby providing graph objects, instances of the compute package classes, thereby providing compute objects, and instances of the property package classes, thereby providing property objects;

wherein the property objects have property values;

wherein the graph objects represent one or more edges and one or more nodes of one or more grid cells for modeling the physical system, the graph objects having at least one index of each said node and at least one index of each said edge, and wherein said indices of said nodes and edges are used to access property values stored in the property objects;

wherein the compute objects compute property values for the property objects by iterating over the at least one index of each said node and the at least one index of each said edge represented by the graph objects; and wherein the non-linear solver package interacts with the one or more model components and the linear solver packages to simulate the flow of fluid through the physical system;

(b) running the composition-based extensible object-oriented program on a computer system to simulate fluid flow in the physical system,
  wherein at least one compute package class of said compute package comprises an interface class;
  wherein said interface class of said at least one compute package class composes one or more interface implementation classes;
  wherein said one or more interface implementation classes of said at least one compute package class comprise one or more implementation class specializations of one or more model components for computing said fluid flow;
  wherein a call to said interface class of said at least one compute package class to perform an operation during said running of said program is forwarded to said one or more implementation class specializations; and
  wherein said one or more implementation class specializations perform computations associated with said operation on said graph objects; and
(c) outputting to a user interface device, a computer readable storage medium, a monitor, a user-accessible local computer, or a user-accessible computer that is part of a network, a simulation of fluid flow from step (b).

2. The method of claim 1, further comprising providing criteria to define common characteristics of properties values; wherein the framework subsystem further comprises a partition package; wherein the one or more model components utilize the partition package to create partition objects comprising subset objects; wherein each said subset object comprises a subset of the node and edge indices; and wherein each said subset object corresponds to grid cells having a common characteristic.

3. The method of claim 2, wherein the common characteristics comprise at least one of AIM-fluid state, fluid phase state, fluid phase state-fluid region type, SCAL region, SCAL region-fluid phase state and phase state-AIM state to phase state-AIM state.

4. The method of claim 2, wherein the compute objects compute property values of the property objects by iterating over the indices in each of the subset objects and applying algorithms that are specific to the common characteristic associated with the subset, and wherein said common characteristic is a same phase state, a same implicit state, or a same phase and implicit state.

5. The method of claim 2, wherein the partition objects are dynamically updated during execution of the program over time to accommodate changing property values due to the flow of the fluid in the physical system such that subsequent property values are efficiently computed.

6. The method of claim 2, wherein a composition-based hierarchy between the one or more model components and at least one of the engine subsystem and the framework subsystem allows the one or more model components to be replaced without modification to at least one class hierarchy of at least one of the engine subsystem and the framework subsystem, respectively.

7. The method of claim 1, wherein a composition-based hierarchy between the one or more model components and at least one of the engine subsystem and the framework subsystem allows the one or more model components to be replaced without modification to at least one class hierarchy of at least one of the engine subsystem and the framework subsystem, respectively.

8. The method of claim 1, wherein the physical system includes a hydrocarbon bearing subterranean reservoir.

9. The method of claim 1, wherein the graph object may represent connectivity associated with one of a well, a reservoir fluid flow or an energy flow.

10. The method of claim 1, wherein the graph package classes are independent of concepts related to the physical or numerical system.

11. The method of claim 1, wherein the program is run on multiple central processing units (CPUs) in parallel.

12. The method of claim 1, wherein the graph package comprises a parallel graph package which comprises one or more parallel graph package classes for representing connectivity information arising from the physical or numerical system in a distributed computing environment.

13. A system for simulating the flow of fluid in a physical system using a composition-based extensible object-oriented program, the system comprising:
  one or more processor units;
  said system comprising one or more programs which cause said one or more processor units to execute steps comprising:
  (a) accessing a composition-based extensible object-oriented program, the program comprising:
    (i) a framework subsystem comprising a graph package which comprises one or more graph package classes for representing one or more edges and one or more nodes of one or more grid cells used for modeling the physical system, a compute package which comprises one or more compute package classes for computing property values, and a property package which comprises one or more property package classes for storing node or edge property values associated with the one or more grid cells;
    (ii) an engine subsystem comprising one or more engine subsystem packages for performing numerical simulation, the engine subsystem comprising a linear solver package and a non-linear solver package; and
    (iii) one or more model components providing physical and numerical modeling behaviors utilized by the engine subsystem, the one or more model components comprising at least one of a reservoir model, a well model, an aquifer model, a fluid model and a SCAL model;
  wherein the one or more model components comprises an interface class;
  wherein said interface class of said one or more model components composes one or more interface implementation classes;
  wherein the one or more model components have a composition-based relationship with at least one of the framework subsystem and the engine subsystem;
  wherein a call from at least one of the framework and the engine subsystem to said interface class of said one or more model components to perform an operation is forwarded to said one or more interface implementation classes of said one or more model components, thereby maintaining separate the type of connection of said interface class of said one or more model components from the computation type of said interface class of said one or more model components;
  wherein the engine subsystems creates one or more model objects representative of the physical system;
  wherein the one or more model components communicates with the framework subsystem to create instances of the graph package classes, thereby providing graph objects, instances of the compute package classes, thereby providing compute objects, and instances of the property package classes, thereby providing property objects;

wherein the property objects have property values;

wherein the graph objects represent one or more edges and one or more nodes of one or more grid cells for modeling the physical system, the graph objects having at least one index of each said node and at least one index of each said edge, and wherein said indices of said nodes and edges are used to access property values stored in the property objects;

wherein the compute objects compute property values for the property objects by iterating over the at least one index of each said node and the at least one index of each said edge represented by the graph objects; and wherein the non-linear solver package interacts with the one or more model components and the linear solver packages to simulate the flow of fluid through the physical system;

(b) running the composition-based extensible object-oriented program on a computer system to simulate fluid flow in the physical system, wherein at least one compute package class of said compute package comprises an interface class;

wherein said interface class of said at least one compute package class composes one or more interface implementation classes;

wherein said one or more interface implementation classes of said at least one compute package class comprise one or more implementation class specializations of one or more model components for computing said fluid flow;

wherein a call to said interface class of said at least one compute package class to perform an operation during said running of said program is forwarded to said one or more implementation class specializations; and wherein said one or more implementation class specializations perform computations associated with said operation on said graph objects; and (c) outputting to a user interface device, a computer readable storage medium, a monitor, a user-accessible local computer, or a user-accessible computer that is part of a network, a simulation of fluid flow from step (b).

14. The system of claim 13, wherein the program further comprises providing criteria to define common characteristics of properties values; wherein the framework subsystem further comprises a partition package; wherein the one or more model components utilize the partition package to create partition objects comprising subset objects; wherein each said subset object comprises a subset of the node and edge indices; and wherein each said subset object corresponds to grid cells having a common characteristic.

15. The system of claim 13, wherein a composition-based hierarchy between the one or more model components and at least one of the engine subsystem and the framework subsystem allows the one or more model components to be replaced without modification to at least one class hierarchy of at least one of the engine subsystem and the framework subsystem, respectively.

16. A computer program product for use in conjunction with a computer having one or more processor units, the computer program product comprising a computer readable storage medium having a computer program mechanism encoded thereon, wherein said computer program mechanism can be loaded into said computer and cause the one or more processor units of the computer to execute steps comprising:

(a) accessing a composition-based extensible object-oriented program, the program comprising:

(i) a framework subsystem comprising a graph package which comprises one or more graph package classes for representing one or more edges and one or more nodes of one or more grid cells used for modeling the physical system, a compute package which comprises one or more compute package classes for computing property values, and a property package which comprises one or more property package classes for storing node or edge property values associated with the one or more grid cells;

(ii) an engine subsystem comprising one or more engine subsystem packages for performing numerical simulation, the engine subsystem comprising a linear solver package and a non-linear solver package; and (iii) one or more model components providing physical and numerical modeling behaviors utilized by the engine subsystem, the one or more model components comprising at least one of a reservoir model, a well model, an aquifer model, a fluid model and a SCAL model;

wherein the one or more model components comprises an interface class;

wherein said interface class of said one or more model components composes one or more interface implementation classes;

wherein the one or more model components have a composition-based relationship with at least one of the framework subsystem and the engine subsystem;

wherein a call from at least one of the framework and the engine subsystem to said interface class of said one or more model components to perform an operation is forwarded to said one or more interface implementation classes of said one or more model components, thereby maintaining separate the type of connection of said interface class of said one or more model components from the computation type of said interface class of said one or more model components;

wherein the engine subsystems creates one or more model objects representative of the physical system;

wherein the one or more model components communicates with the framework subsystem to create instances of the graph package classes, thereby providing graph objects, instances of the compute package classes, thereby providing compute objects, and instances of the property package classes, thereby providing property objects;

wherein the property objects have property values;

wherein the graph objects represent one or more edges and one or more nodes of one or more grid cells for modeling the physical system, the graph objects having at least one index of each said node and at least one index of each said edge, and wherein said indices of said nodes and edges are used to access property values stored in the property objects;

wherein the compute objects compute property values for the property objects by iterating over the at least one index of each said node and the at least one index of each said edge represented by the graph objects; and wherein the non-linear solver package interacts with the one or more model components and the linear solver packages to simulate the flow of fluid through the physical system;

(b) running the composition-based extensible object-oriented program on a computer system to simulate fluid flow in the physical system, wherein at least one compute package class of said compute package comprises an interface class;

wherein said interface class of said at least one compute package class composes one or more interface implementation classes;

wherein said one or more interface implementation classes of said at least one compute package class comprise one or more implementation class specializations of one or more model components for computing said fluid flow;

wherein a call to said interface class of said at least one compute package class to perform an operation during said running of said program is forwarded to said one or more implementation class specializations; and wherein said one or more implementation class specializations perform computations associated with said operation on said graph objects; and (c) outputting to a user interface device, a computer readable storage medium, a monitor, a user-accessible local computer, or a user-accessible computer that is part of a network, a simulation of fluid flow from step (b).

17. The computer program product of claim 16, wherein the program further comprises providing criteria to define common characteristics of properties values; wherein the framework subsystem further comprises a partition package; wherein the one or more model components utilize the partition package to create partition objects comprising subset objects; wherein each said subset object comprises a subset of the node and edge indices; and wherein each said subset object corresponds to grid cells having a common characteristic.

18. The computer program product of claim 17, wherein a composition-based hierarchy between the one or more model components and at least one of the engine subsystem and the framework subsystem allows the one or more model components to be replaced without modification to at least one class hierarchy of at least one of the engine subsystem and the framework subsystem, respectively.

19. The method of claim 1, wherein the composition-based extensible object-oriented program facilitates embedding.

20. The system of claim 13, wherein the composition-based extensible object-oriented program facilitates embedding.

21. The computer program product of claim 16, wherein the composition-based extensible object-oriented program facilitates embedding.

22. The method of claim 1, wherein said indices of said nodes and edges of said graph objects are used to navigate through the model objects.

23. The system of claim 13, wherein said indices of said nodes and edges of said graph objects are used to navigate through the model objects.

24. The computer program product of claim 16, wherein said indices of said nodes and edges of said graph objects are used to navigate through the model objects.

25. The method of claim 1, wherein the property values comprise one or more values corresponding to (i) a property of said physical system, (ii) a state of said numerical simulation, or (iii) a combination of (i) and (ii).

26. The method of claim 1, wherein the property values are one or more values corresponding to phase, state, solution state, relative permeability, density, viscosity, or any combination thereof.

27. The system of claim 13, wherein the property values comprise one or more values corresponding to (i) a property of said physical system, (ii) a state of said numerical simulation, or (iii) a combination of (i) and (ii).

28. The system of claim 13, wherein the property values are one or more values corresponding to phase, state, solution state, relative permeability, density, viscosity, or any combination thereof.

29. The computer program product of claim 16, wherein the property values comprise one or more values corresponding to (i) a property of said physical system, (ii) a state of said numerical simulation, or (iii) a combination of (i) and (ii).

30. The computer program product of claim 16, wherein the property values are one or more values corresponding to phase, state, solution state, relative permeability, density, viscosity, or any combination thereof.

31. The method of claim 1, wherein a compute class is added to said program without modification to at least one class hierarchy of the framework subsystem.

32. The method of claim 31, wherein said compute class is fluid density, internal energy, or equation coefficients.

33. The method of claim 1, wherein the one or more property package classes utilize the one or more graph package classes to determine the number of property values of each said node or of each said edge to be stored in the property objects.

34. The method of claim 2, wherein the partition package comprises one or more partition package classes, and wherein said one or more partition package classes are independent of concepts related to the physical or numerical system.

35. The method of claim 5, wherein the partition objects are dynamically updated over timesteps during execution of the program.

36. The method of claim 5, wherein the compute package provides dynamic class specializations that facilitate the dynamic updating of partition objects are over time during execution of the program.

37. The system of claim 13, wherein a compute class is added to said program without modification to at least one class hierarchy of the framework subsystem.

38. The system of claim 37, wherein said compute class is fluid density, internal energy, or equation coefficients.

39. The computer program product of claim 16, wherein a compute class is added to said program without modification to at least one class hierarchy of the framework subsystem.

40. The computer program product of claim 39, wherein said compute class is fluid density, internal energy, or equation coefficients.

* * * * *